No. 815,024. PATENTED MAR. 13, 1906.
M. LINTON.
BRAKE BEAM HANGER.
APPLICATION FILED JAN. 8, 1906.
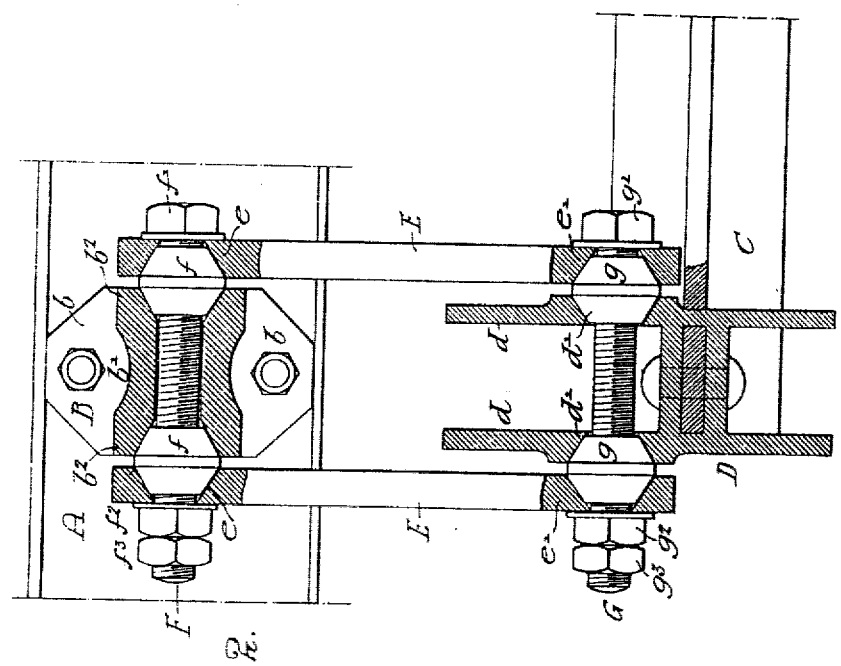
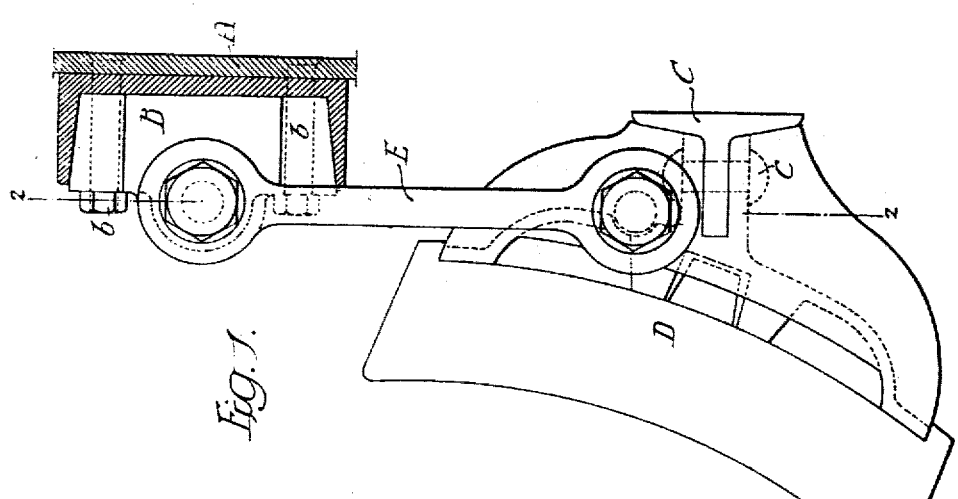
Witnesses:
Walter F. Pallinger
Augustus B. Coppes
Inventor:
Morris Linton.
by his Attorneys,
Howson & Howson

UNITED STATES PATENT OFFICE.

MORRIS LINTON, OF MOORESTOWN, NEW JERSEY, ASSIGNOR TO BURNHAM, WILLIAMS & COMPANY, OF PHILADELPHIA, PENNSYLVANIA, A FIRM.

BRAKE-BEAM HANGER.

No. 815,024.     Specification of Letters Patent.     Patented March 13, 1906.

Application filed January 8, 1906. Serial No. 295,113.

*To all whom it may concern:*

Be it known that I, MORRIS LINTON, a citizen of the United States, residing at Moorestown, New Jersey, have invented certain Improvements in Brake-Beam Hangers, of which the following is a specification.

My invention relates to certain improvements in hangers for the brake-beams of railway-cars.

The object of my invention is to take up any lost motion so that the brake-beam will not become loose and rattle. This object I attain in the following manner, reference being had to the accompanying drawings, in which—

Figure 1 is an end view of a brake-beam, showing the hanger, the frame of the car-truck being in section; and Fig. 2 is a section on the line 2 2, Fig. 1.

In the present instance, A is a portion of the frame of a car-truck.

B is a bearing-block secured to the frame by bolts $b$ $b$.

C is a brake-beam, and D is the brake-shoe secured to the beam by rivets $c$ or other suitable devices. The beam can be of any shape desired and can be secured to the shoe in any manner without departing from the main feature of the invention.

E E are two links connecting the brake-shoe with the block B. A screw-bolt F passes through the upper end of the links E and through an opening $b'$ in the block, and a screw-bolt G passes through the lower portion of the links E and through the wings $d$ $d$ of the brake-shoe D. Mounted on the screw-bolt F are conical sleeves $f f$, and the opening $b'$ in the block B is countersunk at each end $b^2$. The holes $e$ in the links E are also countersunk, so as to fit the tapered sleeves $f f$. The screw-bolt F has a head $f'$ at one end and in the present instance a nut $f^2$ and jam-nut $f^3$ at the opposite end. Washers are placed between the head of the bolt and one of the links and between the nut $f^2$ and one of the links, so that when the nut is turned the links are drawn toward the block B in order to confine the conical sleeves between the block and the links, taking up all lost motion, but allowing the links to freely swing. The same construction is used in coupling the links to the brake-shoe D.

On the screw-bolt G are loose sleeves beveled at each side, as shown in Fig. 2, and these beveled sleeves fit the countersunk openings $d'$ in the brake-shoe and the countersunk openings $e'$ in the links. The screw-bolt has a head $g'$ at one end, and on the opposite end of the bolt are nuts $g^2$ $g^3$, so that on turning the nuts the lost motion can be readily taken up, and the brake-shoe will always remain in the central position in respect to the block B.

I have only illustrated one side of a car-truck, showing one brake-beam hanger; but it will be understood that there is a brake-beam hanger at each side of the truck, and while I prefer to connect the links directly to the shoe in some instances they may be connected to a bracket on the beam at one side of the shoe.

It will be seen that I can readily take up any lost motion which may occur owing to the wear of the parts and can readily repair any breakage by simply removing one or both of the bolts, and as there are no intricate parts the repairs can be made quickly and without much expense.

In some instances the conical sleeves may be mounted at one end only of the links, although I prefer to mount them at each pivot-point.

In the claims I have used the term "brake-beam" to include the entire structure—that is, the beam and the brake-shoe—and where the shoe is not specifically mentioned the term is broad enough to include either connecting the links to the brake-shoe or to a projection at one side of the shoe, as described above.

I claim—

1. The combination in a brake-beam hanger, of a bearing, a brake-beam, links connecting the two, a bolt passing through the links and one of the parts, conical sleeves on the bolt, the parts being recessed to receive the sleeves, substantially as described.

2. The combination in a brake-beam hanger, of a bearing, a brake-beam hung therefrom, links connecting the bearing with the beam, a bolt passing through the links and one of the parts, conical sleeves on the bolt between the links and one of the parts, and means for drawing the links and sleeves toward a central part, substantially as described.

3. The combination in a brake-beam hanger, of a bearing, a brake-beam, links connecting the brake-beam with the bearing, a transverse bolt passing through the bearing and the links, conical sleeves mounted on the bolts, the opening in the bearing and the openings in the links being countersunk for the reception of the sleeves, substantially as described.

4. The combination in a brake-beam hanger, of a bearing, a brake-beam, links extending from the brake-beam to the bearing, openings in each end of each link, a transverse opening in the bearing and a transverse opening in the brake-beam, bolts adapted to said openings, and conical sleeves mounted on the bolts and resting in countersunk portions of the bearing, brake-beam and links, substantially as described.

5. The combination in a brake-beam hanger, of a bearing having an opening therein countersunk at each end, a brake-beam, a brake-shoe mounted thereon, countersunk openings in the brake-shoe, links extending from the bearing to the brake-shoe, said links having countersunk openings in each end, bolts passing through the openings in the links, one bolt passing through the bearing and the other bolt passing through the opening in the shoe, two conical sleeves on each bolt arranged to fit the countersunk openings in the parts, and nuts on the bolts for taking up the lost motion, substantially as described.

In testimony whereof I have signed my name to this specification in the presence of two subscribing witnesses.

MORRIS LINTON.

Witnesses:
LEON P. THOMAS,
EDWARD JAMES ABBOTT.